Jan. 23, 1951        J. N. WEILAND        2,538,997
FLUID CLUTCH WITH PRESSURE BOOSTER

Filed Oct. 7, 1947        3 Sheets-Sheet 1

INVENTOR.
JOHN N. WEILAND
BY
ATT.

Jan. 23, 1951    J. N. WEILAND    2,538,997
FLUID CLUTCH WITH PRESSURE BOOSTER
Filed Oct. 7, 1947    3 Sheets-Sheet 2

INVENTOR.
JOHN N. WEILAND
BY
Gustav A. Wolff
ATT.

Jan. 23, 1951 J. N. WEILAND 2,538,997
FLUID CLUTCH WITH PRESSURE BOOSTER
Filed Oct. 7, 1947 3 Sheets-Sheet 3
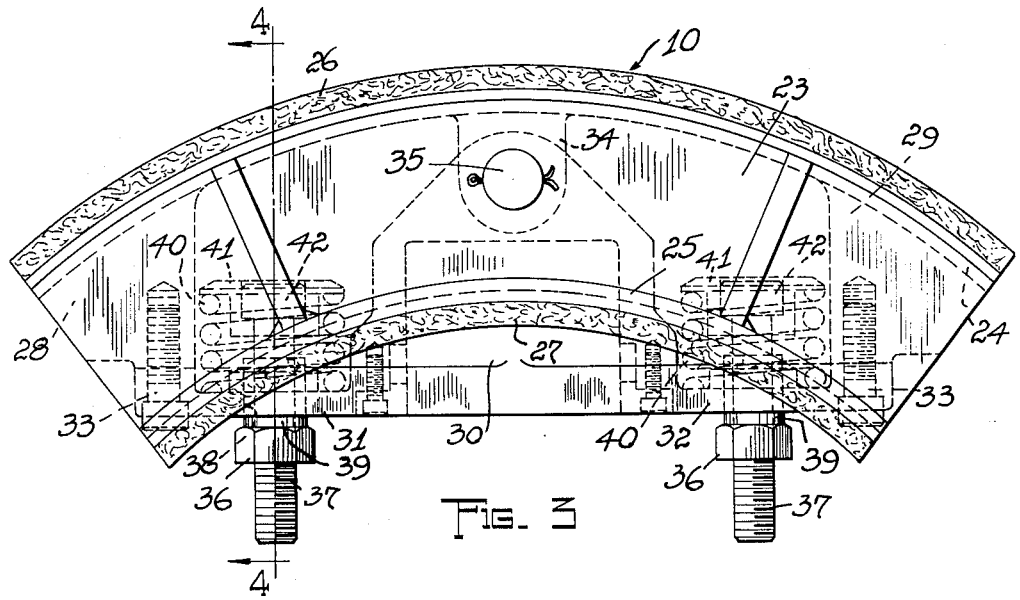
INVENTOR.
JOHN N. WEILAND
BY
Gustav A. Wolff
ATT.

Patented Jan. 23, 1951

2,538,997

UNITED STATES PATENT OFFICE 2,538,997

FLUID CLUTCH WITH PRESSURE BOOSTER

John N. Weiland, Cleveland, Ohio, assignor to The Cleveland Punch & Shear Works Co., Cleveland, Ohio, a corporation of Ohio Application October 7, 1947, Serial No. 778,433

8 Claims. (Cl. 192—85)

1

This invention relates to clutch mechanism embodying double-acting clutching members adapted to selectively couple a single rotary element with either one of two other elements. A clutch mechanism of this type is particularly well suited for power presses and similarly driven machines, in which the energy of a continuously driven member is to be transferred to parts to be driven, and the motion of a part driven is to be arrested, and in which a rotary element is to be selectively coupled with either one of two elements to be driven.

The primary object of the present invention is the provision of a fluid operated clutch mechanism embodying double-acting clutching members, in which mechanism the clutching members consist of shiftably supported friction shoe assemblies arranged to be selectively shifted in opposite directions by individual and joint operation of air operated, liquid operated and mechanically operated devices.

Another object of the invention is the provision of a fluid operated clutch mechanism embodying double-acting clutching members, in which mechanism the clutching members consist of shiftably supported friction shoe assemblies arranged to be shifted in one direction by a combined air and liquid operated device and in the opposite direction by a mechanically operated device.

A further object of the invention is the provision of a fluid operated clutch mechanism embodying double-acting clutching members, which mechanism embodies a base, friction shoe assemblies slidably coupled with said base, and a combination of air operated, liquid operated and mechanically operated means associated with the base and the friction shoe assemblies, so as to selectively shift the friction shoe assemblies in opposite directions.

Still another object of the invention is the provision of a device in which a fluid operated clutch mechanism with double-acting clutching members is combined with a power driven machine having rotary parts to be controlled by the clutch mechanism, in which device the clutch mechanism is mounted on a rotary element of the power driven machine to position the rotary element between other elements to be coupled with said first element, and in which shiftable friction shoe assemblies of the clutch mechanism are shifted by a combination of air operated, liquid operated and mechanically operated means to effect a selective frictional coupling of the first rotary element with one of the other elements when the air and liquid operated means are actuated, and automatically frictionally couple the other one of said other elements with the first rotary element when the air and liquid operated means are inactive.

With the above and other incidental objects in view which will appear hereinafter, the invention consists in certain other novel features of construction and combination of parts, all as set forth in the appended claims, and a preferred form of embodiment of the invention is hereinafter shown with reference to the drawings accompanying and forming part of the specification.

In the drawings:

Fig. 3 is a side elevation of one of the double-acting clutching members disassembled from the base portion of the clutch mechanism.

Fig. 4 is a cross sectional view through the clutching member shown in Fig. 3, the section being taken on line 4—4 of Fig. 3; and Fig. 5 is a side view, partly broken away, of one of the nut members slidably coupling the double-acting clutching member with the base of the clutch mechanism.

Figure 1:
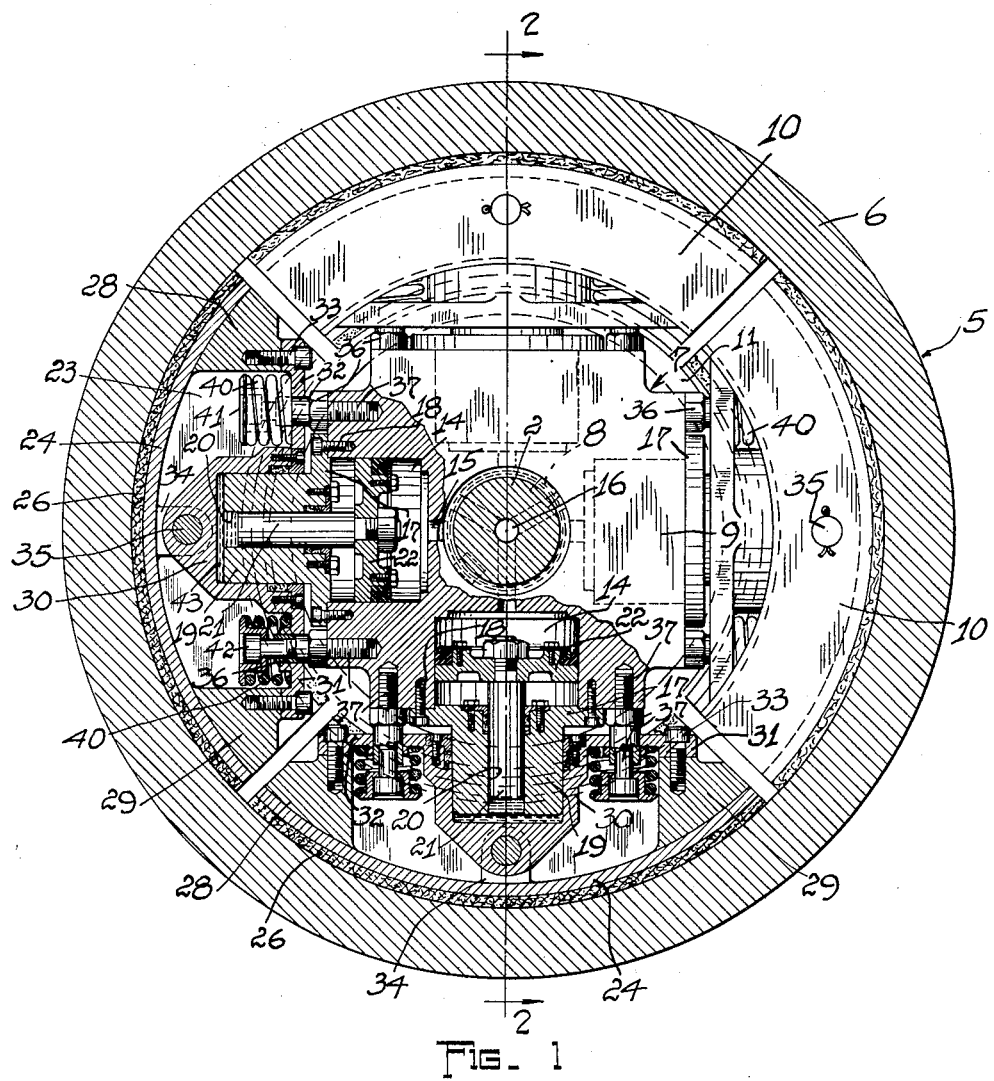
Fig. 1 is a transverse sectional view through a combined air operated, liquid operated and mechanically operated clutch mechanism constructed in accordance with the invention, the mechanism being shown attached and coupled with the driven shaft and fly-wheel of a power driven machine, such as a power press, with the section taken on line 1—1 of Fig. 2 of the drawings.
Figure 2:
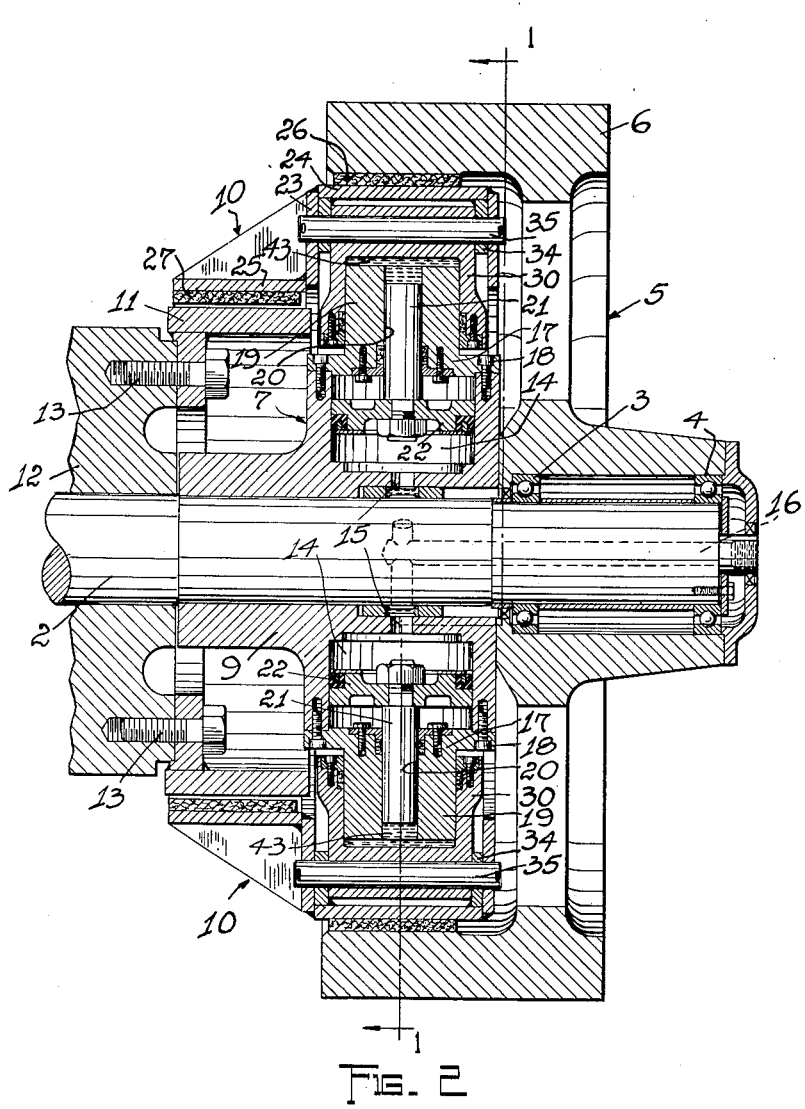
Fig. 2 is a transverse cross sectional view through the clutch mechanism shown in Fig. 1, the section being taken on line 2—2 of Fig. 1.

Referring now in detail to the exemplified form of the invention shown in the drawings, reference numeral 2 denotes the crank shaft of a power driven machine, such as a power press, which shaft freely rotatably mounts in roller bearings 3 and 4 a fly-wheel 5 driven in any suitable manner. The fly-wheel has the inner cylindrical surface of its rim portion 6 smoothly finished and forms the friction clutch drum member for a fluid operated double-acting clutch mechanism 7 mounted on crank shaft 2 and secured thereto by key members 8. Clutch mechanism 7 includes a base member 9 which slidably supports a plurality of circumferentially arranged clutching members 10 constructed for selective clutching operation with rim portion 6 and a brake drum 11 secured to frame 12 of the power driven machine by bolts 13. For such purpose base member 9 is provided with radially arranged cylinder bores 14 which, at their inner ends, communicate through passages 15 with a passage 16 in crank shaft 2 for selective feeding and discharge of fluid into and from the cylinder bores, and which have their outer ends closed by cover members 17 secured to base member 9 by machine screws 18. Cover members 17 include cylindrical extensions 19 axially aligned with cylinder bores 14 and provided with axial bores 20 for pistons 21 on piston members 22 shiftably arranged in cylinder bores 14. Pistons 21 extend into bores 20 and when shifted jointly with piston members 22 effect shifting of clutching members 10, as will be later described.

The clutching members 10 are identical in construction and embody each an arcuate base or web portion 23 and arcuate flanges 24 and 25 extended laterally and in opposite directions from base portion 23. These flanges are lined with brake linings 26, 27, respectively, to provide flange 24 with a convexly shaped friction surface and flange 25 with a concavely shaped friction surface. Each clutching member 10 furthermore includes below its arcuate flange 24 at opposite ends thereof bosses 28, 29 which support a flanged cylinder 30, the flanges 31, 32 of which are attached to bosses 28, 29 by machine screws 33 and, in addition, each clutching member is provided with perforated ear portions 34 extended from the center portion of flange 24 and coupled with the flanged cylinder 30 by a pin 35. Flanged cylinders 30 and clutching members 10 are jointly and radially shiftably coupled with base member 9 by nut-like guiding members 36 which are threadedly engaged with headed studs 37 screwed with their threaded ends into base member 9. For such purpose flanges 31 and 32 of cylinders 30 are perforated at 38 and have slidably extended through such perforations the cylindrical end portions 39 of guiding members 36. Clutching members 10 are forced inwardly toward base member 9 by pretensioned compression springs 40 seated between the flanges 31, 32 and hollow flanged spring retainer members 41 sleeved upon headed studs 37 and held in proper working position by the heads 42 of the studs.

In the thus described clutch mechanism 7 cover member 17 has its cylindrical extension 19 slidably disposed in cylinder 30 and piston member 22 has its piston 21 slidably disposed in the bore 20 of extension 19. This arrangement provides a simple means to effect high pressure clutching operations of clutching members 10 by low pressures in the fluid pressure line controlling the clutch mechanism. The ratio of clutching pressure is proportionate to the size of the cross section of piston member 22 with respect to the cross section of piston 21, as displacement of the liquid in hydraulic cylinder chamber 43 by piston 21 increases the pressure in said cylinder chamber proportionate to the cross sections of piston member 22 and piston 21.

The clutching members 10 are yieldingly forced toward base member 9 by pretensioned compression springs 40 until arcuate flanges 25 frictionally engage brake drum 11 with their concavely shaped friction surfaces. When, however, fluid under pressure, such as compressed air from a source not shown, is fed through passages 16 and 15 into cylinder bores 14, such fluid effects outward shifting of piston members 22 and pistons 21, causes displacement of the liquid in hydraulic cylinder chamber 43 and radial outward shifting of cylinders 30 and the clutching members 10 coupled therewith until the arcuate flanges 24 frictionally engage the friction clutch drum member formed by the inner cylindrical surface of the rim portion 6 of fly-wheel 5. Such outward shifting of the clutching members is effected against the tension of the pretensioned compression springs 40 and effects an increase in the tension of the springs, so that release of the fluid pressure in cylinder bores 14 effects automatic shifting of the clutching members by compression springs in an opposite direction until flanges 25 of the clutching members frictionally engage brake drum 11.

The clutch mechanism herein described may readily be adapted to selectively couple independently rotatable driving and driven members with each other and take the place of so-called two-way friction clutches especially suited for use with two-ratio or reversible transmissions such as a marine transmission, etc.

Having thus described my invention, what I claim is:

1. In a double-acting clutch mechanism a rotary base member, a plurality of air cylinders in said base member arranged radially with respect thereto, pistons in said air cylinders, radially moving force multiplying hydraulic pressure means actuated by said pistons, double-acting friction shoe members directly secured to said hydraulic pressure means to be shifted thereby in one direction, and pretensioned spring means yieldingly coupling said hydraulic pressure means with said base member to yieldingly counteract said hydraulic pressure means and radially yieldingly shift said friction shoe members in the opposite direction when the pistons in said air cylinders are inactive.

2. In a double acting clutch mechanism, a rotary base member having formed therein a plurality of fluid cylinders arranged radially with respect to the rotation thereof; outwardly operable piston members in said cylinders, said piston members having outwardly disposed pistons mounted thereon; hydraulic pressure means, each said means including cylindrical extensions mounted substantially radially on the rotary base member and having cylindrical bores within which said outwardly disposed pistons are movable, and also including outer hydraulic cylinder members slidably supported on said cylindrical extensions, said cylindrical extensions being in operable relation as a fixed hydraulic cylinder to said outwardly disposed pistons and as a fixed hydraulic piston to said outer cylinder members; double acting friction shoe members directly secured to the said outer hydraulic cylinder members, whereby said friction shoes are shifted outwardly upon actuation of the hydraulic pressure means by the piston members of the fluid cylinder; and pretensioned spring means yieldingly coupling said outer hydraulic cylinder members to said base member, thereby to oppose yieldingly the outward force and motion of said outer hydraulic cylinder members and to shift said outer hydraulic cylinder members and attached said friction shoe members in the opposite direction when the piston members in the fluid cylinder are inoperative.

3. In a double acting clutch mechanism, a rotary base member having formed therein a plurality of fluid cylinders arranged radially with respect to the rotation thereof; outwardly operable piston members in said cylinders, said piston members having outwardly disposed pistons mounted thereon, and said piston members having a diameter larger than the diameter of the outwardly disposed piston; hydraulic pressure means, each said means including cylindrical extensions mounted substantially radially to the rotary base member and having cylindrical bores within which said outwardly disposed pistons are movable, and also including outer hydraulic cylinder members slidably supported on said cylindrical extensions, said cylindrical extensions being in operable relation as a fixed hydraulic cylinder to said outwardly disposed pistons and as a fixed hydraulic piston to said outer cylinder members; double acting friction shoe members directly secured to the said outer hydraulic cylinder members, whereby said friction shoes are shifted outwardly upon actuation of the hydraulic pressure means by the piston members of the fluid cylinder; and pretensioned spring means yieldingly coupling said outer hydraulic cylinder members to said base member, thereby to oppose yieldingly the outward force and motion of said outer hydraulic cylinder members and to shift said outer hydraulic cylinder members and attached said friction shoe members in the opposite direction when the piston members in the fluid cylinder are inoperative.

4. In a double-acting clutch mechanism, a rotary base member having formed therein a plurality of cylindrical cavities, the axes of which are radial with respect to the rotation of the base member; fluid operated piston members movable in said cylindrical cavities; outwardly extending pistons mounted on said piston members; cylindrical extensions mounted on the rotary base member over the cylindrical cavities, said cylindrical extensions having their axes radial with respect to the rotation of the base member and having cylindrical hydraulic bores therethrough within which said outwardly extending pistons are movable; outer hydraulic cylinder members mounted on the cylindrical extensions, said cylinder members being outwardly operable hydraulically by the outward movement of the outwardly extending pistons; double-acting friction shoe members directly coupled with the outer hydraulic cylinder members; laterally extending perforated flanges on each outer hydraulic cylinder member, said flanges being secured to the double-acting friction shoe members; guiding means for the double-acting friction shoe members, said guiding means including headed members mounted on the base member and extending through the perforations of said flanges; and pretensioned spring means in axial alignment with respect to the guiding means and interposed between the headed portion of the guiding means and the flanges to yieldably counteract the outward shifting of said double-acting friction shoe members by the operation of the hydraulic cylinder members and to effect a shifting of the same in the opposite direction when the hydraulic cylinder members are inactive.

5. A double-acting clutch mechanism as described in claim 4 wherein said double-acting friction shoe members each embody a web portion, arcuate flanges extended in opposite directions laterally from said web portion and spaced boss-like portions mounting the flanges of the said outer hydraulic cylinder members.

6. In a double acting clutch mechanism a rotary base member, a plurality of radially acting fluid cylinder and piston mechanisms carried by the base member, double acting friction shoe members radially shiftably coupled to said base member, radially acting hydraulic force multiplying means mounted on said base member between each of said friction shoe members and each of said fluid cylinder and piston mechanisms, said force multiplying means being directly coupled with said friction shoe members and being actuated by the pistons of said fluid cylinder and piston mechanisms.

7. In a double-acting clutch mechanism, a rotary base member; double-acting friction shoe members; and fluid operated shifting means coupled to and actuating said friction shoe members in one direction, each of said fluid operated shifting means including an air cylinder and a hydraulic force multiplying cylinder system coupled therewith by a double piston member actuated by air entering said air cylinder and actuating said hydraulic force multiplying cylinder system, said hydraulic force multiplying cylinder system including a shiftable cylinder fixed to one of said friction shoe members, and an axially bored piston for said shiftable cylinder fixed to said base member, said double piston member being disposed as an air actuated piston in said air cylinder and also as an actuating piston in the bore of said axially bored piston.

8. A double-acting clutch mechanism as described in claim 7, wherein the shiftable hydraulic cylinder is slidably coupled with said base member, wherein guide means on said base member guide said shiftable cylinder and said double-acting friction shoe members and wherein pretensioned spring means coupled with said guide means and engaged with said base member yieldingly counteract shifting of said double-acting friction shoe member by said fluid operated shifting means and effect shifting of said double-acting friction shoe member in the opposite direction when said fluid operated shifting means are inactive.

JOHN N. WEILAND.

REFERENCES CITED

The following references are of record in the file of this patent:

UNITED STATES PATENTS

| Number | Name | Date |
|---|---|---|
| 1,594,259 | Hardman | July 27, 1926 |
| 1,655,131 | Brown | Jan. 3, 1928 |
| 1,858,004 | Eason | May 10, 1932 |
| 2,117,683 | Sauzedde | May 17, 1938 |
| 2,151,153 | Rode et al. | Mar. 21, 1939 |
| 2,213,383 | Canfield | Sept. 3, 1940 |
| 2,393,010 | Arnold et al. | Jan. 15, 1946 |
| 2,449,717 | Robertson | Sept. 21, 1948 |
| 2,458,664 | Weiland | Jan. 11, 1949 |

FOREIGN PATENTS

| Number | Country | Date |
|---|---|---|
| 3,517 | Great Britain | Feb. 17, 1899 |
| 350,386 | France | Dec. 8, 1905 |
| 541,445 | France | May 2, 1922 |